358-84. OR 2,864,885 SR

SEARCH ROOM

SUBSCRIBER TELEVISION SYSTEM

Filed Dec. 8, 1951 3 Sheets-Sheet 1

T 5027

Rx

INVENTOR:
GEORGE V. MORRIS
BY Francis W. Crotty
HIS ATTORNEY.

Dec. 16, 1958 G. V. MORRIS 2,864,885

SUBSCRIBER TELEVISION SYSTEM

Filed Dec. 8, 1951 3 Sheets-Sheet 2

INVENTOR:
GEORGE V. MORRIS
BY Francis W. Crotty
HIS ATTORNEY.

Dec. 16, 1958 G. V. MORRIS 2,864,885

SUBSCRIBER TELEVISION SYSTEM

Filed Dec. 8, 1951 3 Sheets-Sheet 3

INVENTOR:
GEORGE V. MORRIS
BY Francis W. Crotty
HIS ATTORNEY.

United States Patent Office 2,864,885
Patented Dec. 16, 1958

2,864,885

SUBSCRIBER TELEVISION SYSTEM

George V. Morris, Chicago, Ill., assignor to Zenith Radio Corporation, a corporation of Delaware Application December 8, 1951, Serial No. 260,735
9 Claims. (Cl. 178—5.1)

This invention relates to subscription television systems, and more particularly to a new and improved method and system for disseminating and recording charges in such television systems.

Patent 2,547,598, issued April 3, 1951, in the name of Erwin M. Roschke, entitled "Subscription, Image Transmission System and Apparatus," and assigned to the present assignee, discloses and claims a subscription television system in which coding of a television signal is effected by varying the timing of its video components relative to its line-synchronizing components in accordance with a coding schedule. A key signal representing the coding schedule is distributed to subscriber receivers over a line circuit or by any other suitable means.

The system of the present invention is one in which coding and decoding of the television signal may be accomplished in a manner similar to that disclosed in the Roschke patent. However, in the present system other signals representing a charging rate of each telecast are distributed to the subscriber receivers in addition to the key signal. These charging signals, for example, may comprise series of pulses having a repetition frequency representing a charging rate for the individual telecast and are utilized by the subscriber receivers to record the total charges for a plurality of telecasts extending over any selected period. The key signal and charging signals may be modulated on individual sub-carriers which, in turn, are modulated on a main carrier for distribution to the receivers over a line circuit or over an ether link. Alternatively, the key signal and any of the charging signals may be modulated on either the picture or sound carriers of the television signal for dissemination to the subscriber receivers.

Under some conditions it may be desirable that the various subscribers be assessed a fixed charge for a particular telecast, regardless of whether a subscriber views the entire program or merely a portion thereof. That is, each subscriber is to be charged a selected "admission" even if he tunes in after the program has begun or tunes out before it is ended. For this purpose, a charging signal may be transmitted to the receivers during the entire program, characterized by a selected frequency representing the admission charge for the particular telecast and remaining constant throughout the entire program. Each receiver includes apparatus for selecting this charging signal whenever the receiver is tuned to the telecast and for applying the selected signal to a charging register for a certain time interval which may be two or three minutes. The register is actuated at a rate determined by the frequency of the charging signal and records a related program charge.

It may also be desirable to assess the subscription charge on an accruing basis, taking into consideration the portion of the telecast that is utilized by a given subscriber. That is, in addition to a nominal "admission" charge established in the manner described above, the subscriber may also be charged in proportion to the part of the telecast he has actually viewed. To accomplish this, a second charging signal may be concurrently transmitted to the receivers having an assigned frequency representing the accruing or continuous charging rate to be assessed for a particular program. After the first-mentioned charging signal is applied to the register to record the initial admission charge, the second charging signal is continuously impressed thereon to actuate the register as long as the receiver is tuned to the telecast and at a rate determined by the frequency of the second signal. Should a subscriber tune his receiver to a particular program which is already in progress, this fixed charge may be reduced by decreasing the frequency of the first charging signal at selected intervals as the program progresses.

It is, accordingly, an object of the present invention to provide a new and improved system and method for subscription television broadcasting, particularly for disseminating and recording subscription charges.

A further object of the invention is to provide an improved television system in which fixed as well as accruing charges may be assessed for the subscription service.

Yet another object of the invention is to provide improved charging apparatus for use in the subscriber receivers which respond to charging signals to record charges assessed for each subscription broadcast.

The improved subscription television system of this invention comprises a transmitter and at least one receiver. The transmitter includes a source for producing a television signal representing a program to be transmitted to the receiver. Coding apparatus is coupled to the source for coding the television signal in accordance with a coding schedule. A generator is provided for producing at least one charging signal having a characteristic adjustable over a range of values corresponding to a range of subscription rates, and means is included in the generator for establishing the characteristic of the charging signal at a value within the range and representing a particular subscription rate for the program. Means also are provided for transmitting the coded television signal and the charging signal concurrently to the receiver.

The receiver includes an image-reproducing device, and means for receiving the coded television signal and for supplying it to the reproducing device. The coding apparatus is coupled to the last-mentioned means for effectively decoding the television signal as applied to the reproducing device. A register is provided for recording the subscription charges, and a control device is coupled to the register and responds to an applied signal to actuate the register at a rate determined by the applied signal. Finally, means is provided for selecting the charging signal and for supplying it to the control device.

The features of this invention which are believed to be new are set forth with particularity in the appended claims.. The invention itself, however, together with further objects and advantages thereof may best be understood by reference to the following description when taken in conjunction with the accompanying drawings in which:

Figure 1:
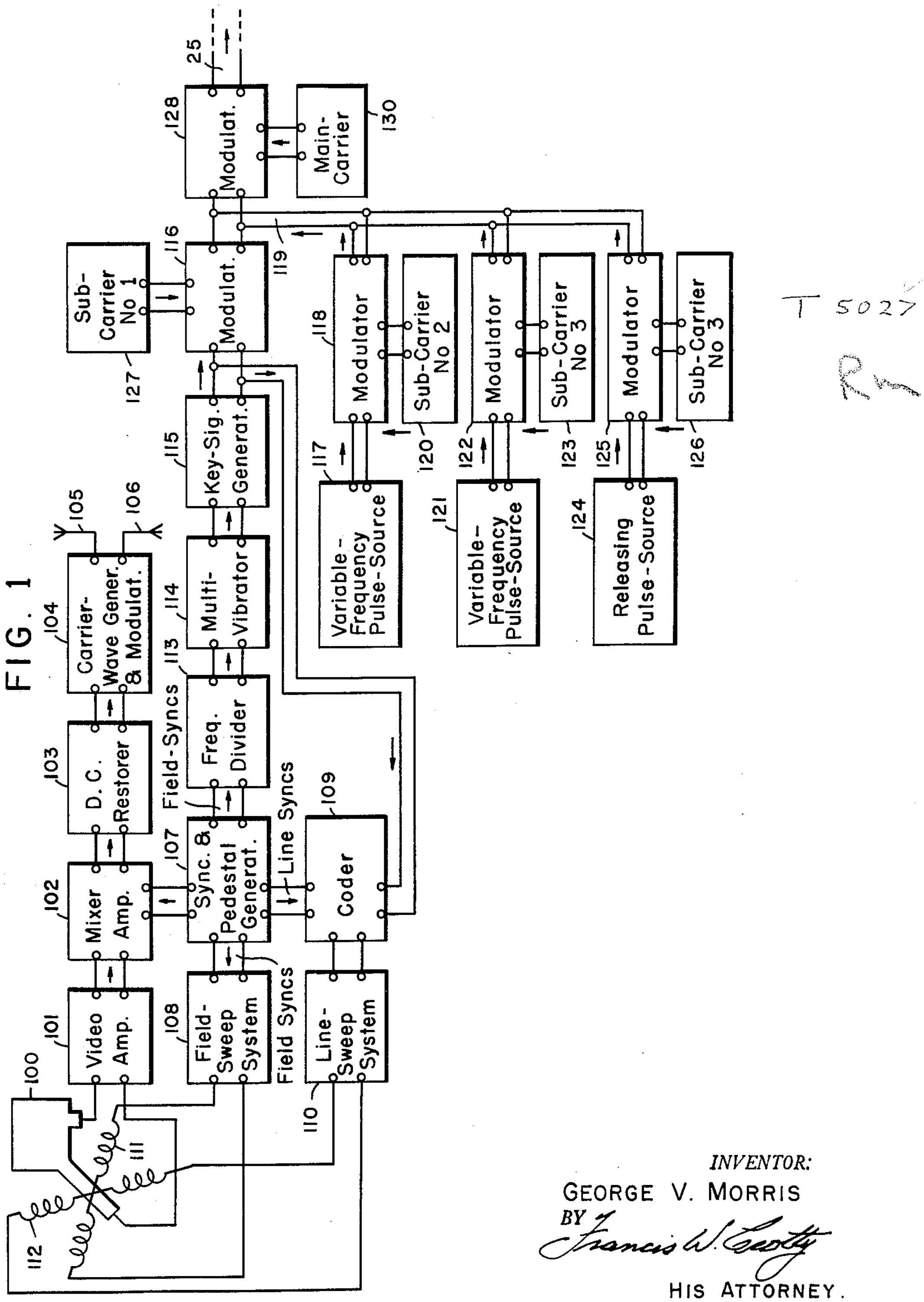
Figure 1 is a transmitter embodying the invention.

The transmitter represented in Figure 1 includes a picture-converting device 100 which may be an iconoscope, image-orthicon or any other well-known type and which is connected to a video amplifier 101, in turn, connected to a mixer amplifier 102. The output terminals of the mixer amplifier are coupled through a direct-current restorer 103 to a carrier-wave generator and modulator 104, the latter being connected to an appropriate antenna circuit 105, 106.

The transmitter also includes a synchronizing-signal and pedestal generator 107 for producing line- and field-synchronizing pulses and associated pedestals for application to mixer amplifier 102. Generator 107 further supplies field-synchronizing pulses to a field-sweep system 108, and line-synchronizing pulses through a coder 109 to a line-sweep system 110. The output terminals of sweep systems 108 and 110 are connected to the field-deflection elements 111 and line-deflection elements 112 associated with device 100.

Generator 107 further supplies field-synchronizing pulses to a frequency divider 113 which may be of the random type disclosed and claimed in copending application Serial No. 32,457, filed June 11, 1948, and issued March 11, 1952, as Patent 2,588,413, in the name of Erwin M. Roschke, entitled "Random Frequency Divider," and assigned to the present assignee. The output terminals of frequency divider 113 are connected to a multivibrator 114 which may be of the "Eccles-Jordan" type. That is, the multivibrator is one that may be triggered from one stable operating condition to another by successive pulses of like polarity from the frequency divider. The output terminals of multivibrator 114 are connected to a key-signal generator 115 which, in turn, is connected to a modulator 116 and to coder 109.

The transmitter as thus far described is similar to that disclosed in the aforesaid Roschke Patent 2,547,598 and is incorporated herein by reference merely as an illustration of one particular system for producing a coded television signal for subscription purposes. The present invention is concerned with the distribution and utilization of charging signals to be considered more particularly hereinafter, and may be used in conjunction with any known type of subscription system.

In the operation of the subscription transmitter, picture-converting device 100 generates a video signal representing the image intelligence to be telecast, and after amplification in video amplifier 101 this signal is supplied to mixer amplifier 102 wherein it is combined with the synchronizing- and pedestal-components from generator 107 to develop a composite television signal. The television signal is appropriately adjusted as to background level in direct-current restorer 103, modulated on a suitable picture carrier in unit 104, and radiated by antenna circuit 105, 106. Field-sweep system 108 is synchronized at the field frequency determined by generator 107 and the field scansion of device 100 is similarly synchronized. Line-sweep system 110, however, is controlled by driving pulses having a time relation, compared to the line-synchronizing components from generator 107, that is changed from time to time by coder 109 to effect coding.

More particularly, the randomly-divided field-synchronizing pulses from divider 113 actuate multivibrator 114 from one of its stable operating conditions to the other at random times. The multivibrator energizes or actuates key-signal generator 115 when it is in a given one of its operating conditions, causing the key-signal generator to produce bursts of key signal at its output terminals during randomly-timed spaced intervals. These bursts of key signal are supplied to coder 109 to establish a coding schedule and to modulator 116 for distribution to subscriber receivers for decoding purposes. Coder 109 responds to bursts of key signal to add or delete a time delay in the drive for the line-sweep system, thereby to vary the timing of the line-synchronizing pulses applied to line-sweep system 110 and, consequently, the timing of the line scansion of device 100 during spaced operating intervals. As a result, the timing of the video signal produced by device 110 is altered relative to the line-synchronizing pulses applied to mixer 102 during such spaced intervals. In this manner, the television signal is effectively coded since its reproduction without decoding causes the image to jitter on the screen of the picture tube at the receiver.

In order to facilitate assessing subscription charges for the telecast, the transmitter includes a source 117 for producing pulses of constant amplitude and duration but of a variable repetition frequency. For convenience, it shall be referred to as a variable-frequency pulse source and it is connected through a modulator 118 and leads 119 to the output terminals of modulator 116. Modulator 118 also receives a sub-carrier signal developed by a generator 120. The transmitter further includes a second variable-frequency pulse source 121 likewise connected through a modulator 122 to leads 119. Modulator 122 receives a sub-carrier signal from generator 123 having a distinctly different frequency from that of the sub-carrier supplied by generator 120. Another source 124 for supplying what shall be termed releasing pulses is also included in the transmitter, and is connected through a modulator 125 to leads 119. This modulator receives a sub-carrier signal having a distinctive frequency from a sub-carrier generator 126. Modulator 116 is connected to still another sub-carrier generator 127 likewise having a distinctive operating frequency, and the output terminals of this modulator are connected through a modulator 128 to a line circuit 25, modulator 128 receiving a main carrier signal from a generator 130. The several generators and modulators 115—130 are employed in disseminating coding and charging information to subscriber receivers. Specifically, bursts of key signal from key-signal generator 115 which convey the coding schedule are modulated in unit 116 on the sub-carrier from generator 127, and this modulated sub-carrier is modulated in unit 128 on the main carrier signal from generator 130. Source 117 includes a control (not shown) for adjusting the repetition frequency of the pulses generated therein to a value representing the selected charging rate for the subscription broadcast. These pulses occur at a uniform predetermined rate throughout the entire program interval and form the basis for an accruing or continuous charge for the broadcast. Such pulses are modulated on the sub-carrier signal from generator 120 in modulator 118, and the modulated sub-carrier is modulated in modulator 128 on the main carrier signal from generator 130.

Source 121 may also include an adjustment for setting the repetition rate of the generated pulses to a particular value within a range which represents a fixed initial or admission charge for the telecast. These pulses, which are generated throughout the entire program interval, are modulated in modulator 122 on the sub-carrier from generator 123, and the modulated sub-carrier is modulated on the main carrier signal in modulator 128. Instead of maintaining a constant repetition rate for these pulses, indicating a fixed initial charge, the pulse rate may be varied throughout the program to represent a decreasing initial charge for the benefit of those who may tune in late. Of course, the change in initial charge may be decreased continuously throughout the program, although it may prove more convenient to effect a stepwise reduction at the end of selected time intervals, for example every fifteen minutes.

At the end of each program, source 124 generates one or a series of releasing pulses for releasing and resetting subscription apparatus of the receivers. These pulses are modulated on the sub-carrier from generator 126 in modulator 125, and the modulated sub-carrier is modulated on the main carrier in unit 128. The actuation of pulse generator 124 and the change in repetition frequency of generator 121 may be correlated to program intervals by any conventional timing mechanism.

Line circuit 25 conveys the main carrier modulated by a series of sub-carriers individually modulated by code and charging information. When desired, such information may be modulated on either the sound or picture carriers and radiated with the television signal, or may be distributed as a separate radiation.

Figure 2:
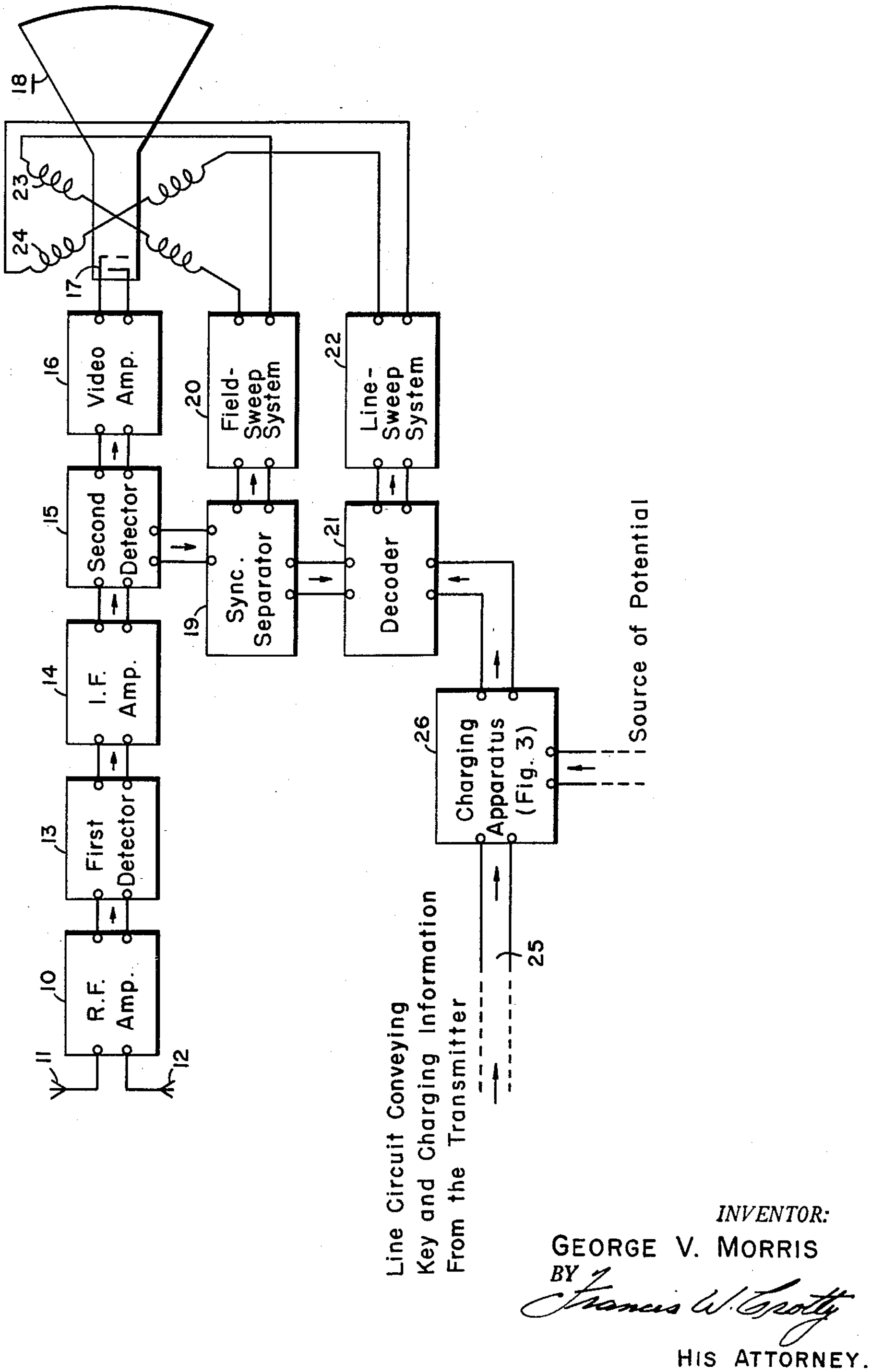
Figure 2 is a receiver for operation in conjunction with the transmitter of Figure 1, and, Figure 3 is a detailed representation of an improved charging apparatus constructed in accordance with the invention and employed in the receiver of Figure 2.

The receiver of Figure 2 is capable of utilizing the coded subscription television signal radiated by the transmitter of Figure 1 to reproduce the image intelligence and of utilizing the supplemental information received over line 25 for recording the charges assessed for the subscription service. The receiver includes a radio-frequency amplifier 10 having input terminals connected to an antenna circuit 11, 12 and output terminal connected to a first detector 13. The first detector is connected to an intermediate-frequency amplifier 14 which, in turn, is coupled to a second detector 15. The output terminals of the second detector are connected through a video amplifier 16 to the input electrodes 17 of a cathode-ray image-reproducing device 18. Second detector 15 is also coupled to a synchronizing-signal separator 19 which is connected to a field-sweep system 20 and through a decoder 21 to a line-sweep system 22. The output terminals of sweep systems 20 and 22 are connected, respectively, to the field-deflection elements 23 and line-deflection elements 24 associated with device 18. The decoder 21 has further input terminals connected to line circuit 25 through a unit 26 which includes the improved charging apparatus of the invention.

When the receiver is tuned to the subscription television signal radiated by the transmitter of Figure 1, this signal is intercepted by antenna 11, 12 and amplified in radio-frequency amplifier 10. The amplified signal is heterodyned to the selected intermediate frequency of the receiver in first detector 13 and the resulting intermediate-frequency signal is amplified in amplifier 14. The amplified intermediate-frequency signal is detected in second detector 15 to produce a composite video signal which, in turn, is amplified in video amplifier 16 and impressed on the input electrodes 17 of image-reproducing device 18 to control the intensity of the cathode-ray beam therein in accordance with the picture intelligence.

The synchronizing components of the television signal are separated from the video components by synchronizing-signal separator 19, the field-synchronizing components being supplied to field-sweep system 20 and the line-synchronizing components being supplied through decoder 21 to line-sweep system 22. In this manner, the line and field scansions of device 18 are synchronized with the incoming television signal. A key signal, indicating the coding schedule of the received television signal, is received as a modulation component of the carrier signal supplied over line circuit 25. This key signal is selected by a suitable filter and demodulator to be considered presently and decoder 21 responds to this key signal to vary the timing of the line-synchronizing pulses applied to line-sweep system 22 at the proper times and in the proper sense to compensate for the aforedescribed changes in timing between the video and line-synchronizing components of the received television signal, enabling device 18 to reproduce the picture intelligence. This receiver is described in detail in the aforementioned Roschke patent, and since the invention is not concerned with this portion of the receiver itself, further description thereof is deemed to be unnecessary.

Figure 3:
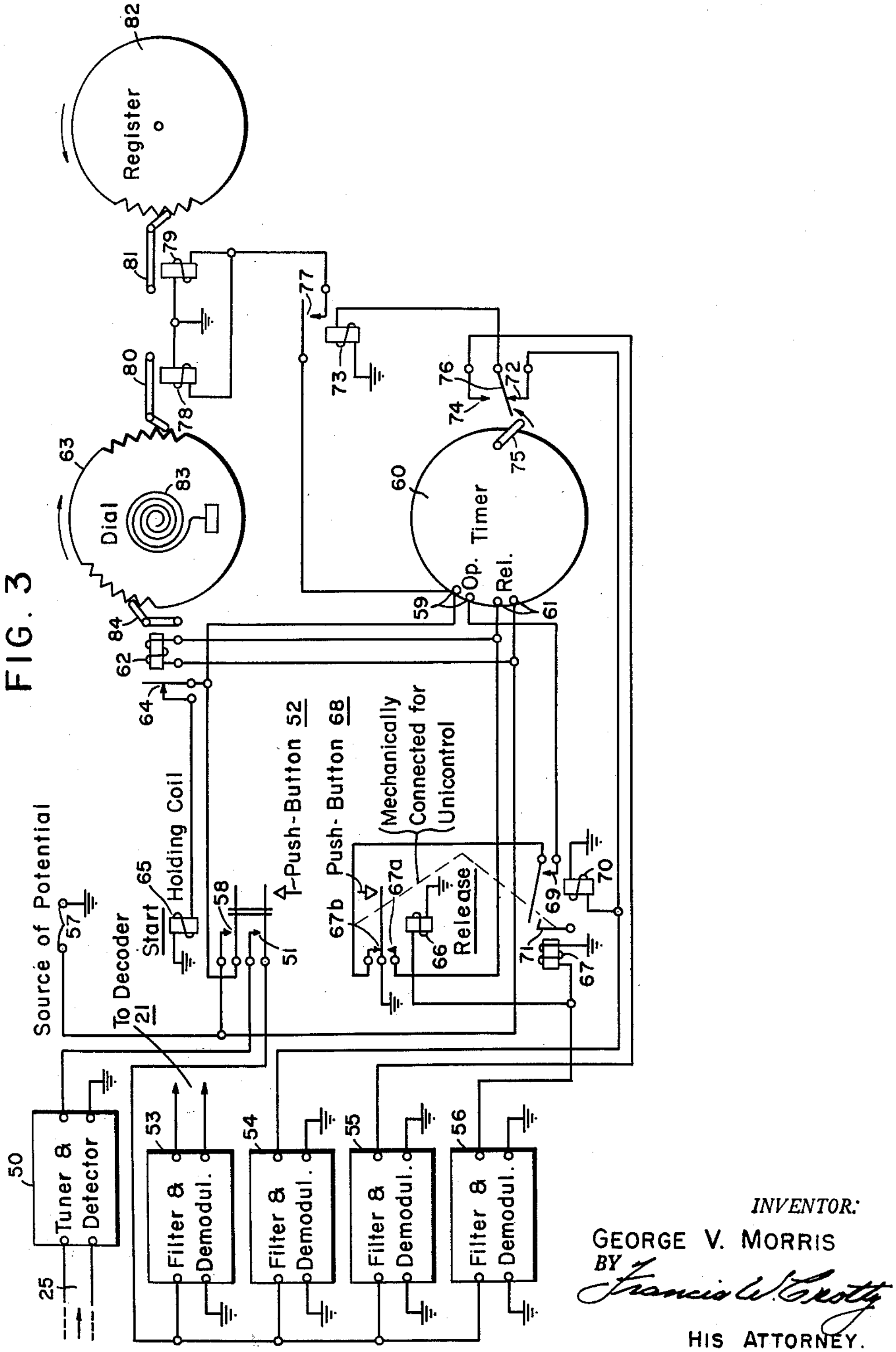

In order to select the code-identifying key signal and to effect subscription charges, the receiver includes the apparatus of Figure 3 comprising a tuner and detector 50 connected to line circuit 25 and tuned to the main supplemental carrier signal received concurrently with the coded television signal. Detector 50 may be connected through a pair of normally open contacts 51 of a push-button switch 52 to a series of filters and demodulators 53—56. Filter 53 is selective to the sub-carrier signal that is modulated with bursts of key signal, and the key signal appears at the output terminals of the associated demodulator for application to decoder 21. Units 54 and 55 select the two sub-carrier signals modulated in accordance with charging information, whereas unit 56 responds to the sub-carrier signal bearing the releasing pulses. More specifically, the charging signal related to the initial program cost is produced at the output terminals of unit 54, the charging signal representing the accruing or time charge appears at the output terminals of unit 55, and the releasing pulses are produced at the output terminals of unit 56.

The charging apparatus has a further pair of input terminals 57 connected to a source of energizing potential. One of these terminals is grounded and the other may be connected through a pair of normally open contacts 58 of push button switch 52 to one terminal 59 of the operating mechanism of a timer 60. This timer may be any conventional clock mechanism similar to a stop watch and including a sweep arm driven along a circular path by the clock drive but subject to being set to a fixed reference position upon the actuation of a reset arrangement. Moreover, it is preferred that the sweep arm be driven a fixed distance from its reference position whenever the clock mechanism is energized. The ungrounded terminal 57 of the potential source is also connected to one terminal 61 of the reset or release mechanism of timer 60 and to one terminal of a release solenoid 62 associated with a dial register 63. The potential-supply connected to terminal 59 of the timer also extends through a pair of normally closed contacts 64 associated with solenoid 62 and through holding coil 65 associated with push-button switch 52 to ground.

Unit 56 has a pair of output terminals, one of which is grounded. The ungrounded output terminal is connected through a release solenoid 66 to ground and also through a further solenoid 67 to ground. Release solenoid 66 has a normally open contact 67$a$ and another contact 67$b$ normally engaged by the movable contact of the solenoid which is manually operable by a push-button 68. The low-potential terminal 61 of the release mechanism of timer 60 may be connected through contact 67$a$ to ground and it is permanently connected to the other terminal of solenoid 62 actuating the reset mechanism of dial 63. Contact 67$b$ is normally connected to ground and through a pair of normally open contacts 69 associated with a solenoid 70 to the low potential terminal 59 of the operating mechanism of timer 60. The contacts 69, when closed, are retained in that condition by a latch 71 until energization of solenoid 67 releases the latch. Preferably, push-button 68 and latch 71 are unicontrolled as indicated by the dotted line so that operation of the push-button releases the latch to open contacts 69.

Unit 54 has a pair of output terminals, one of which is grounded while the other is connected through solenoid 70 to ground and is further connected through a normally closed contact 72 of timer 60 and through a solenoid 73 to ground. The ungrounded terminal of unit 55 may be connected through a normally open contact 74 associated with timer 60 and through solenoid 73 to ground. There is a movable contact member 76 for engaging either contact 72 or contact 74. While it normally rests against contact 72, a switch operating arm 75 movable in the direction indicated by the arrow and driven by timer 60, may engage member 76 and move it to open contact 72 and close contact 74. The restricted travel of arm 75 causes it to retain contact member 76 against contact 74 until the release mechanism of timer 60 is energized.

The ungrounded power-supply terminal 57 may be further connected to ground through contacts 58, a pair of normally open contacts 77 associated with solenoid 73, and the parallel arrangement of a pair of solenoids or stepping relays 78 and 79. Relay 78 has an armature 80 mechanically connected with dial 63 and arranged to move this dial one step each time the solenoid is energized. Similarly, stepping relay 79 has an armature 81 for effecting stepwise movement of a register 82 each time the relay is energized.

Dial 63 is intended to register the total charges for any particular program, and may be calibrated, for example, in steps of five cents up to several dollars. The dial arrangement includes a reset coil spring 83 which is wound as the dial is advanced by stepping relay 78. The dial is held at any setting by a pawl or latch 84 constituting the armature of release solenoid 62. Charging register 82 is likewise calibrated, but its calibrations extend to a higher order than those of dial 63 for this register records and totals charges over a long period, for example, several weeks. The register is moved in step-by-step fashion by a stepping pawl 81 under the control of solenoid 79. The rate at which the dial or register accumulates a charge record depends upon the repetition frequency of pulses applied to the stepping relays.

In considering the operation of the apparatus of Figure 3, assume that the receiver of Figure 2 is tuned to the subscription television signal radiated from the transmitter of Figure 1, and that the subscriber wishes to view the telecast represented by this signal. Tuner and detector unit 50 is tuned to the supplementing main carrier signal which conveys the code and charging information related to the selected subscription telecast. Push-button switch 52 is operated manually, closing contacts 51 and 58. When contacts 58 close, an energizing circuit for holding coil 65 is completed from the ungrounded power-supply terminal 57 through contacts 58 and the normally closed contacts 64 to ground. The holding coil thereupon maintains push-button switch 52 in its actuated condition. The closure of contacts 51 impresses the several modulated sub-carrier signals from unit 50 on the filters and demodulators 53–56. Unit 53 derives the key signal representing the coding schedule of the transmitter and applies it to decoder 21, enabling the receiver to decode the telecast and reproduce the image intelligence.

Assume now that there is to be no charge for the first few minutes of the program interval. In such a case, there is no charging information modulated on the sub-carrier, at least for the corresponding portion of the program, and there is no output signal from units 54 or 55. The timer mechanism 60 is not energized due to the fact that contacts 69 are open and switch operator 75 of timer 60 remains in its illustrated position. Stepping relays 78 and 79 are de-energized so that neither dial 63 nor register 82 is operated and no charge is recorded. After the "free" portion of the program, if there is to be any, the sub-carriers received over line circuit 25 are modulated with charging information which may constitute a fixed admission charge, a time charge, or both.

Should the program bear a selected "admission" charge only and no continuous or time charge, only the sub-carrier signal selected by unit 54 is modulated with charging information. Specifically, it is pulse modulated at a pulse repetition frequency corresponding to this admission charge and the modulation may continue unchanged throughout the entire program. Unit 54 demodulates this charging signal and develops a series of pulses having a repetition frequency related to the selected admission charge. The first such pulse from unit 54 energizes solenoid 70 and closes contacts 69 which are held closed by latch 71. Closure of contacts 69 completes an energizing circuit for the operating mechanism of timer 60, which may be traced from the ungrounded power-supply terminal 57 through closed contacts 58, terminals 59, closed contacts 69, and through normally closed contact **67*b* to ground. The timer 60 drives switch operating arm 75 in the direction of the arrow, and after a selected interval (for example two or three minutes) arm 75 shifts contact arm 76, breaking a circuit at contact 72 and closing a circuit at contact 74. However, each charging pulse obtained from unit 54 prior to the displacement of contact arm 76 energizes solenoid 73 through contacts 72 causing the solenoid to close contacts 77 for the pulse duration. Each time contacts 77 close, an energizing circuit is completed from the ungrounded power-supply terminal 57, through closed contacts 58 and contacts 77 and stepping relays 78 and 79 to ground. Therefore, dial 63 and register 82** are actuated to record an initial or admission charge determined by the frequency of the charging pulses. The described sequence of events, recording an initial charge, occurs no matter when in the program the subscriber tunes in, and the same initial charge is made provided the pulse rate of the particular charging signal remains constant. If the pulse rate is decreased (continuously or in a step fashion) throughout the program interval, the initial charge is pro-rated for subscribers who tune in late.

If in addition to the "admission" charge, a continuous accruing charge is also to be assessed, the sub-carrier signal selected by unit 55 is also pulse-modulated at a rate corresponding to the selected continuous charge. This sub-carrier is demodulated by unit 55, which develops a series of pulses having a repetition frequency corresponding to the continuous charge. Such pulses are ineffective, however, until switch arm 75 shifts contact arm 76 into engagement with contact 74 to complete an output circuit from unit 55 and that does not occur until the initial admission charge has been recorded. Thereafter, each of the pulses representing the continuous charge energizes solenoid 73 and actuates stepping relays 78 and 79, causing an incremental charge to be recorded on dial 63 and register 82 in the previously described manner. If there is to be no significant admission charge, the sub-carrier selected by unit 54 may be modulated by a single pulse recurring at widely spaced intervals to energize solenoid 70. This provides for the actuation of timer 60, causing it to close contacts 74 so that the charging signal from unit 55 may be applied to solenoid 73. Alternatively, the output circuit of unit 55 may include relay 73 in which case actuation of timer 60 is not required to record a subscription charge solely in a continuous or time-of-use basis.

At the end of each program, the sub-carrier signal devoted to the releasing or resetting operation is pulse modulated and is detected in unit 56, causing this unit to develop a series of pulses. The first reset pulse energizes solenoid 66, closing contacts **67*a* to complete a trip circuit from input terminals 57 to the release mechanism of timer 60 and to solenoid 62 in order to energize these elements. Actuation of the release mechanism causes switch actuating arm 75 to return to its initial position, and energization of solenoid 62 releases pawl 84, causing dial 63 to return to its zero setting under the force of spring 83. Moreover, contacts 64 are opened, deenergizing holding coil 65 and restoring push-button 52 to its open position. The releasing pulses also energize solenoid 67, releasing latch 71 and returning contact 69** to its open position. The charging apparatus is now reset and upon the receipt of the next program its sequence of operations is initiated again. The reset or release relays may be slow-return relays to provide adequate time for the resetting operation.

The release and reset operations may be set in motion at any time during the program by a subscriber depressing push-button 68. When the resetting has been accomplished, dial 63 no longer registers a charge, the purpose of this dial being merely to indicate to the subscriber the total charge for any single program. Register 82, on the other hand does not return to zero, but records the charges accruing over a selected period. It is intended that this latter register be read from time to time so that periodic charges can be assessed to the subscriber.

Accordingly, the improved charging apparatus is capable of recording fixed and continuous charges, either individually or in combination for any particular program. Moreover, the apparatus provides an indication of the individual charge for any particular program as well as a record of the accruing charges for a series of programs received over any selected period. It is possible for a subscriber at his election to interrupt the program and the accruing charges thereof. The subscription rates, both as to admission and as to continuous charges, may be varied from time to time, even during the program, by merely varying the pulse-modulation frequency of the charging sub-carrier signals, and, if desired, any program may be distributed free of charge by merely omitting the charging signals. Moreover, although frequency control of the charging signals represents a convenient means for charge assessment, other characteristics of such signals such as duration, spacing, amplitude and the like may similarly be controlled for establishing charging rates.

While a particular embodiment of the invention has been shown and described, modifications may be made, and it is intended in the appended claims to cover all such modifications as may fall within the true spirit and scope of the invention.

I claim:

1. A subscription television transmitter comprising: means for producing a television signal representing a program to be transmitted to subscriber receivers; coding said television signal in accordance with a coding schedule; means for generating a charging signal independent of said coding schedule and having successively repetitive pulses of a pulse repetition rate adjustable over a selected range corresponding to a range of subscription rates; means for adjusting the pulse repetition rate of said charging signal to a value within said selected range representing a particular subscription rate for said program; means for transmitting the coded television signal and the charging signal concurrently to subscriber receivers; and means for varying the pulse repetition rate of the charging signal to other values within said selected range as said program progresses.

2. A subscription television transmitter comprising: means producing a television signal representing a program to be transmitted to subscriber receivers; means for coding said television signal in accordance with a coding schedule; means for generating a first charging signal independent of said coding schedule and having a frequency adjustable over a selected range corresponding to a range of accruing subscription charges per unit of time; means for adjusting the frequency of said first charging signal to a value within said selected range representing a particular accruing rate for said program; means for generating a second charging signal independent of said coding schedule and having a frequency adjustable over a selected range corresponding to a range of fixed subscription charges; means for adjusting the frequency of said second charging signal to a value within said last-mentioned selected range representing a particular fixed rate for said program; means for transmitting the coded television signal and said first and second charging signals concurrently to subscriber receivers; and means for varying the frequency of said second charging signal to other frequencies within said last-mentioned selected range as said program progresses.

3. A subscription type of television system comprising a transmitter and at least one receiver, said transmitter including: a source for producing a television signal representing a program to be transmitted to said receiver; coding apparatus for coding said television signal in accordance with a coding schedule; a first generator for producing a first charging signal independent of said coding schedule and having a frequency adjustable over a range of frequencies corresponding to a range of accruing subscription charges per unit of time; means, included in said first generator, for adjusting the frequency of said first charging signal to a frequency within said frequency range and representing a particular accruing charge for said program; a second generator for producing a second charging signal independent of said coding schedule and having a frequency adjustable over a range of frequencies corresponding to a range of fixed subscription charges; means, included in said second generator, for adjusting the frequency of said second charging signal to a frequency within said last-mentioned range representing a particular fixed rate for said program; means for transmitting the coded television signal and said first and second charging signals concurrently to said receiver; said receiver comprising: an image-reproducing device; means for receiving the coded television signal and for supplying said television signal to said reproducing device; decoding apparatus for effectively decoding said television signal as applied to said reproducing device; a register for recording subscription charges; a control device responsive to an applied signal for actuating said register at a rate determined by the frequency of said applied signal; means for selecting said first and second charging signals and for supplying said first and second charging signals to said control device.

4. Charging apparatus for use in a television receiver of the type utilizing a coded subscription television signal, said apparatus comprising: a register for recording subscription charges; a control device responsive to an applied signal for actuating said register at a rate determined by the value of a characteristic of said applied signal; an input circuit for deriving a first signal having said characteristic adjustable over a range of values corresponding to a range of subscription rates and established at a value within said range representing a fixed charge for the subscription signal; another input circuit for deriving a second signal having said characteristic adjustable over a range of values corresponding to a range of subscription rates and established at a value within said range representing an accruing charge for the subscription signal; means for applying said second signal to said control device; means for applying said first signal to said control device; and a timer mechanism for disassociating said last-mentioned means from said control device after a preselected charging interval.

5. Charging apparatus for use in a television receiver of the type utilizing a coded subscription television signal, said apparatus comprising: a register for recording subscription charges; a control device responsive to an applied signal for actuating said register at a rate determined by the value of a characteristic of said applied signal; an input circuit for deriving a signal having said characteristic adjustable over a range of values corresponding to a range of subscription rates and established at a value within said range representing a particular subscription rate for the subscription television signal; means for applying said last-mentioned signal to said control device; a self-timer mechanism operative from a first to a second condition for independently disassociating said last-mentioned means from said control device after a preselected charging interval; and means for deriving a releasing signal at the termination of a selected program interval and for supplying said releasing signal to said timer mechanism to return said mechanism to its first operating condition.

6. Charging apparatus for use in a television receiver of the type utilizing a coded subscription television signal, said apparatus comprising: a register for recording subscription charges; a control device responsive to an applied signal for actuating said register at a rate determined by the value of a characteristic of said applied signal; an input circuit for deriving a signal having said characteristic adjustable over a range of values corresponding to a range of subscription rates and established at a value within said range representing a particular subscription rate for the subscription television signal; means for applying said last-mentioned signal to said control device; a timer mechanism operative from a first to a second condition for disassociating said last-mentioned means from said control device after a preselected charging interval; and means for deriving a releasing signal at the termination of a selected program interval and for supplying said releasing signal to said timer mechanism and to said register to return said timer to its first operating condition and said register to a reference indicating position.

7. A subscription television receiver comprising: means for decoding a received television signal representing a given subscription program; means for registering a fixed charge component at the commencement of decoding in an amount independent of the program reception time interval but dependent on the particular time decoding is commenced during the program interval; and means for registering an accruing charge component in an amount dependent on the program reception time interval.

8. A subscription television receiver comprising: means for decoding a received television signal representing a given subscription program; means for registering a subscription charge concurrently with the utilization of said decoded television signal; and means for varying the rate of registering the subscription charge within the program interval and in accordance with information received with said television signal.

9. A subscription television transmitter comprising: means for producing a television signal representing a program to be transmitted to subscriber receivers; means for coding said television signal in accordance with a coding schedule; means for generating a charging signal independent of said coding schedule and having a characteristic adjustable over a selected range corresponding to a range of subscription rates; means for adjusting said characteristic of said charging signal at the commencement of said program to a value within said selected range representing a particular subscription rate for viewing the entire duration of said program; means for transmitting the coded television signal and the charging signal concurrently to subscriber receivers; and means for varying said characteristic of the charging signal as said program progresses to other values within said selected range dependent upon the time elapsed since commencement of said program and representing different and proportionally smaller rates for viewing progressively smaller fractions of said program.

References Cited in the file of this patent

UNITED STATES PATENTS

| | | |
|---|---|---|
| 2,094,060 | Busch | Sept. 28, 1937 |
| 2,570,187 | Aram | Oct. 9, 1951 |
| 2,573,349 | Miller et al. | Oct. 30, 1951 |
| 2,656,407 | Herrick et al. | Oct. 20, 1953 |
| 2,731,620 | Gottfried | Jan. 17, 1956 |
| 2,788,387 | Druz | Apr. 9, 1957 |

UNITED STATES PATENT OFFICE

CERTIFICATE OF CORRECTION

Patent No. 2,864,885 December 16, 1958

George V. Morris

It is hereby certified that error appears in the printed specification of the above numbered patent requiring correction and that the said Letters Patent should read as corrected below.

Column 9, line 22, before "coding" insert -- means for --.

Signed and sealed this 5th day of May 1959.

(SEAL)
Attest:

KARL H. AXLINE
Attesting Officer

ROBERT C. WATSON
Commissioner of Patents